T. Moore.
Horse-Collar.
N° 73368.    Patented Jan. 14, 1868.

Witnesses.
Theo Truche
J. A. Service

Inventor:
Thomas Moore
Per Munn & Co
Attorneys

United States Patent Office.

THOMAS MOORE, OF NEW YORK, N. Y.

Letters Patent No. 73,368, dated January 14, 1868.

---

IMPROVED HORSE-COLLAR.

---

The Schedule referred to in these Letters Patent and making part of the same.

---

TO ALL WHOM IT MAY CONCERN:

Be it known that I, THOMAS MOORE, of 86 Marion street, in the city, county, and State of New York, have invented a new and useful Improvement in Horse-Collars; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

This invention relates to an improvement in the construction of horse-collars, and consists in forming the collar of two pieces of leather, instead of five or more, as usual, which two inside and outside leathers are shaped to fit the stuffed skeleton of a collar by the hand after being made soft by soaking in water in such manner that the inside piece of leather forming the throat of the collar, and the outside piece of leather, shall both extend continuously around the bend at the bottom of the collar, and meet again at the top, there to be either fastened together or left open in the ordinary way.

Collars, as usually made of several pieces, have a seam across the bend at the bottom, on the inside and outside, which seam is apt to open under the strain of the pole-strap, and exposure to rain and perspiration that settle in it. For this reason a collar made in the usual way frequently gives way at this part before other parts are injured materially by service.

Figure 1:
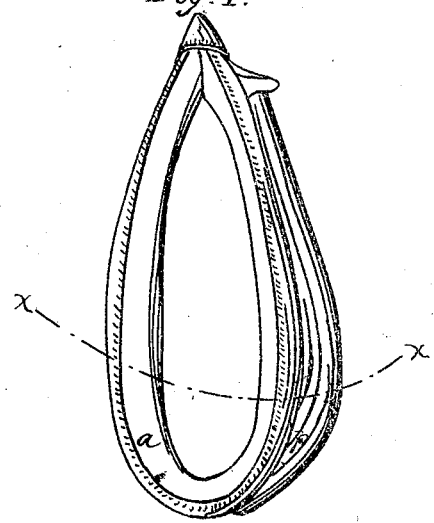
Figure 1 is a perspective view of my improved horse-collar.
Figure 2:
Figure 2 is a transverse section through the line $x\,x$, fig. 1.

My improved plan of constructing a horse-collar of two pieces, with a whole throat, makes it stronger, neater, and more serviceable. The inside of the collar is formed, as shown in fig. 1, of a single piece of leather, $a$, extending from the top, and bent around at the bottom continuously, without a seam; and the outside is also formed, in the same manner, of a single piece of leather, $b$, bent around at the bottom without a cross-seam. The two pieces of leather are stretched and shaped by hand when water-soaked, to adapt all parts to the curvatures and indentations required to fit the stuffed skeleton, which is prepared in the usual way. The sides of the two pieces are then sewed together, thus requiring only two seams all around the collar to secure it, as shown clearly in the drawing.

Having thus described my invention, what I claim as new, and desire to secure by Letters Patent, is—

Forming a horse-collar with one outside and one inside leather-piece joined together at the sides, with two seams only, and bent around continuously at the bottom, so as to make a collar with a whole throat, having no cross-seam, arranged substantially as herein described.

The above specification of my invention signed by me, this 10th day of April, 1867.

THOMAS MOORE.

Witnesses:
WM. F. MCNAMARA,
ALEX. F. ROBERTS.